Figure 1:
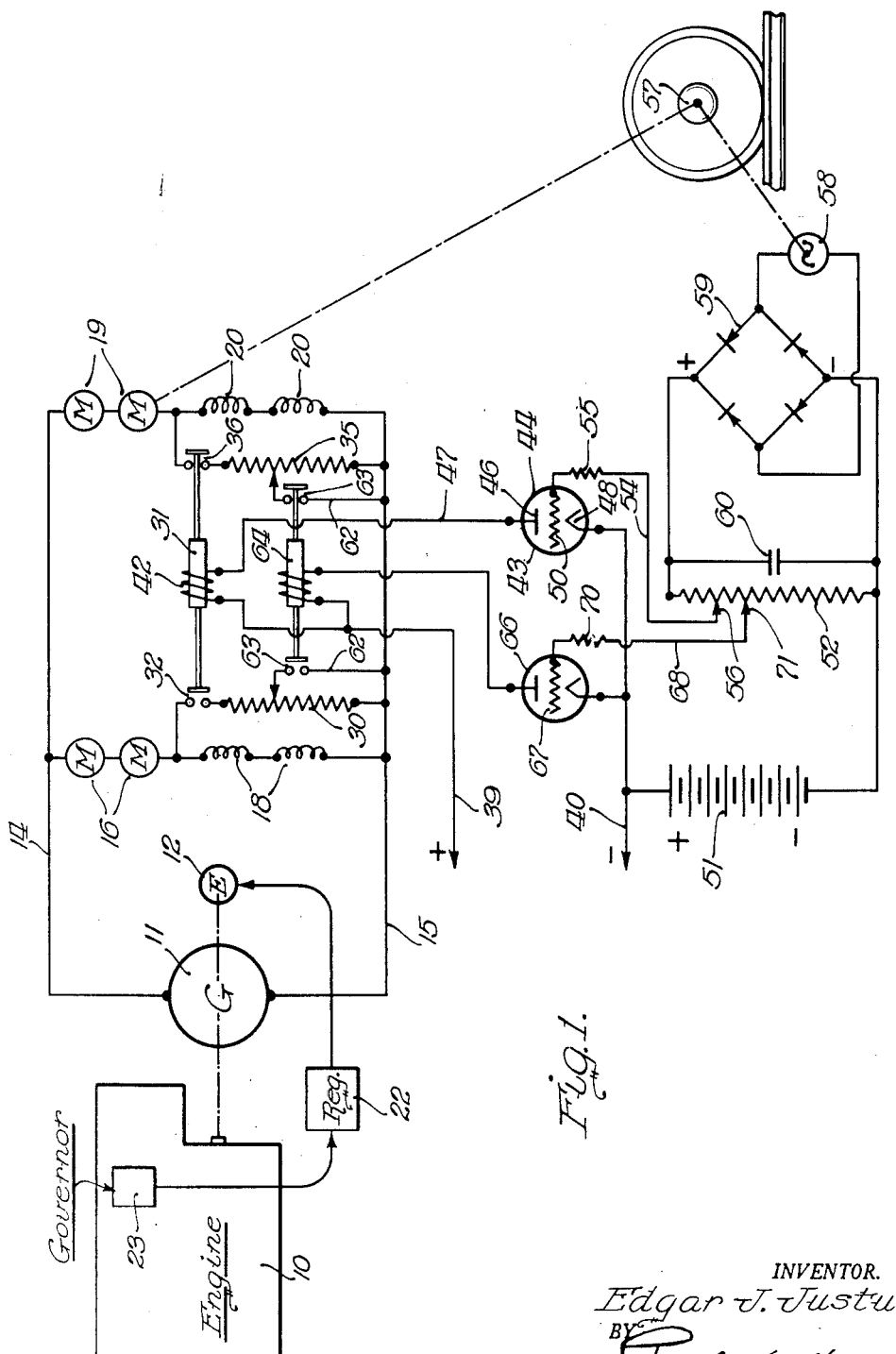

Nov. 11, 1952     E. J. JUSTUS     2,617,970

TRACTION MOTOR CONTROL

Filed April 7, 1950     2 SHEETS—SHEET 1

INVENTOR.
Edgar J. Justus
BY Paul L. Kroha
Atty.

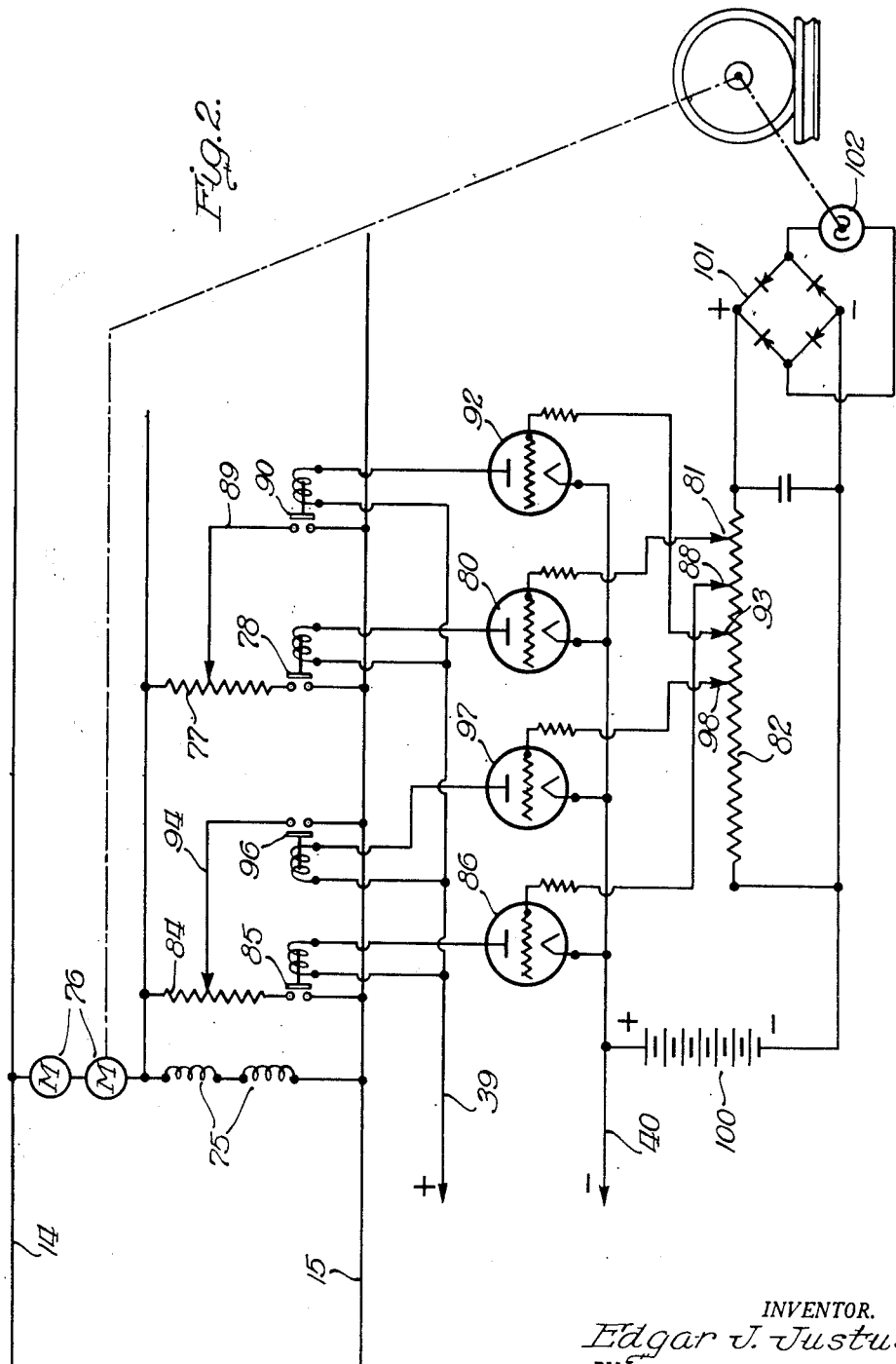

Patented Nov. 11, 1952

2,617,970

UNITED STATES PATENT OFFICE 2,617,970

TRACTION MOTOR CONTROL

Edgar J. Justus, Beloit, Wis., assignor to Fairbanks, Morse & Co., Chicago, Ill., a corporation of Illinois Application April 7, 1950, Serial No. 154,647

7 Claims. (Cl. 318—249)

This invention relates to improvements in electric traction motor control for railway vehicles and the like, and has particular reference to the provision of a highly effective vehicle speed responsive control system of electronic character, for controlling the traction motors of a diesel-electric locomotive.

As is well known in diesel-electric locomotive practice, it is highly desirable from the standpoint of engine operating efficiency in particular, to maintain engine operation substantially at normal full power output corresponding to any selected engine speed within the speed range of the engine. To that end, it is the usual practice to equip the locomotive with suitable control means preferably responsive to engine governor position, for regulating the power output of the generator supplying the traction motors, such as to maintain generator loading of the engine at a value equivalent to the full power output of the engine at the selected engine speed. Because locomotive space restrictions and other well known factors impose limitations on the size and character of the generator equipment, it is necessary further, to make suitable provision for preventing unloading of the engine at certain locomotive speeds when the generator output voltage is at a maximum, since at or beyond that point the generator power output falls off materially, with consequent decrease in engine loading. The usual practice to care for the latter condition when occurring, is to alter the operating characteristics and field excitation of the traction motors in a manner to restore the engine-generator load balance such as to enable continued engine operation at its normal full power output corresponding to the given speed setting of the engine. Resistance-shunting of the series fields of the traction motors is well-known expedient for this purpose. However, shunting control provision of known and prevailing forms are subject in general, to certain disadvantages. Where the shunting control is operated in accordance with generator voltage acting through relays, the latter may open and close the resistor circuits repeatedly since the engine governor-responsive generator output control cannot effect generator loading adjustment instantly with change in engine load. Moreover, at low engine speeds, the generator voltage at the point of engine unloading may be and usually is, insufficient to operate the relays, thereby requiring voltage adjusting provisions in the relay operating circuits in order to provide for low generator voltage response of the relays at the critical points of traction system operation when motor field resistance shunting is necessary.

It is the general purpose and objective of the present invention therefore, to avoid the disadvantages of a relay system such as above indicated, and similar disadvantages encountered in the operation of other well known systems for the purpose indicated, as generator voltage responsive system for changing the traction motor connections between series, series-parallel and parallel circuit relationships of the traction motors. The foregoing objective is attained through the present provision of a relatively simple and economical, yet highly effective electromagnetic relay system for controlling resistance-shunting of the traction motor series fields. As herein preferred, the system utilizes grid controlled vacuum tubes under predetermined fixed grid bias voltage, and a generator device producing voltages which are proportional to the speed of the locomotive. The voltages of the generator device are applied to the vacuum tube grids in opposition to the grid bias voltage, through a voltage divider for determining conductance of the tubes in predetermined sequence as the locomotive speed increases, and conversely, determining non-conductance of the tubes in inverse sequence as locomotive speed decreases. In series with the tubes for energization thereby, are electromagnetic relays controlling the resistance shunt circuits. A more complete understanding of the present improved system will be had from the following description of the embodiments shown diagrammatically in the accompanying drawing, wherein:

Fig. 1 illustrates a circuit arrangement embodying the present improvements applied to two-step resistance-shunting control, and Fig. 2 illustrates the circuit for four-step control of resistance-shunting of traction motor fields, effected in the manner afforded by the present invention.

Referring to the system of Fig. 1, the numeral 10 designates a prime mover as a diesel engine, having its power output shaft in driving connection with the rotors of a main generator 11 and exciter 12, the latter supplying excitation current to the field of the main generator as is well understood. The main generator supplies power over the conductors 14 and 15 to the traction motors of the railway locomotive embodying the present system. As here shown, the traction motors 16 including the series fields 18 thereof, are arranged in series across the generator conductors, while a second set of traction motors 19 and their series fields 20 are similarly arranged in series across the generator supply conductors. In accordance with known practice, adjustment of generator output to correspond to the engine output at a given engine speed, is effected through regulation of the exciter 12 by a regulator 22 of any suitable form, responsive to the operation of the engine governor indicated at 23. While the governor responsive exciter regulating means is here shown diagrammatically only, a specific example of a regulator means suitable for the purpose, is disclosed in an application by a Gunnard T. Holt and John K. Stotz, entitled "Power Plant Regulation," filed December 28, 1949, and bearing Serial Number 135,508.

Turning now to the traction motor control system forming the subject of the invention, in shunt circuit with the serially connected traction motor series fields 18 is a suitable resistance 30 the shunt connection of which is controlled by an electromagnetic relay 31 providing the control switch 32. A like resistance 35 is in shunt circuit with the series fields 20 of the other set of traction motors 19, the resistance circuit being controlled by the relay 31 through the control switch 36. Energization of relay 31 produces simultaneous closure of the switches 32 and 36 from a normally open condition, the latter effected by a spring (not shown) or other suitable means. Operating current for the relay 31 is supplied through leads 39 and 40 from a suitable D. C. source such as the usual locomotive power source for auxiliary equipment, the lead 39 being directly connected to the relay operating coil 42, while the lead 40 is connected to the relay coil through an electronic control relay 43. Relay 43 is constituted by a three-element vacuum tube 44 providing a plate element 46 connected to the coil by a lead 47, a cathode element 48 to which the supply lead 40 is connected, and a control grid element 50. The grid 50 is under a constant negative bias battery 51 of predetermined constant voltage, having its positive terminal connected to the supply lead 40 and its negative terminal connected to one end of a resistor 52 forming a voltage divider as will appear hereinafter. A lead 54 including a current limiting resistance element 55, connects the grid 50 to a tap 56 on the divider 52. Opposing the grid bias voltage in connection to the ends of the divider resistance 52, is a D. C. voltage source the voltage of which varies with the speed of the railway vehicle or locomotive. In practice, such source is provided conveniently by a relatively small A. C. generator 58 in driven connection with a wheel axle 57 of the locomotive, and a suitable rectifier device indicated diagrammatically at 59, rectifying the A. C. output of the generator to a direct current voltage across the voltage divider 52. The circuit of the rectified source may include a filtering condenser 60 as shown. The capacity of the axle driven generator 58 is selected with regard to the negative grid bias battery 51, while the point of grid connection to the voltage divider 52 is predetermined, such that in locomotive operation below a vehicle speed at which the heretofore described engine unloading condition tends to occur, the negative bias will prevail to prevent current conductance through the vacuum tube relay. The electromagnetic relay 31 will then have its switches open, so that the resistance 30 and 35 will not be effective in shunt to the traction motor fields 18 and 20. However, at the indicated critical speed of the locomotive, the rectified voltage from the axle generator prevails over the negative grid bias, to render the tube conductive, thus permitting a current flow sufficient to operate the relay 31 to introduce the resistances in shunt to the traction motor fields. The result is a weakening of the motor field excitation with the consequent increase in motor current, so that the voltage of the motor system is then below the maximum or engine unloading voltage of the main generator 11. The altered traction motor excitation thus restores the engine-generator load balance to permit continued full utilization of the power output of the engine operating at a given speed.

As the locomotive speed increases materially beyond the above indicated critical speed, a condition of engine unloading will be again approached or reached, so that further modification of traction motor excitation is necessary to restore the engine-generator load balance. Accordingly, to care for the next higher critical speed of the locomotive, the traction motor field excitation is further weakened by shunting a portion of each of the resistances 30 and 35. Each resistance therefore, is provided with a shunting circuit 62 including a relay switch 63. The switches 63 are actuated in unison by a common electromagnet 64 the energization of which is controlled by an electric relay constituted by the three-element vacuum tube 66. The electromagnet 64 and tube 66 are connected to the supply leads 39 and 40 in parallel with the first described magnet coil 42 and tube 44, while the grid element 67 of tube 66 is connected by lead 68 including current-limiting resistor 70, to a second tap 71 on the voltage divider 52. The location of tap 71 on divider 52 is adjusted so that in response to the increased voltage of the axle generator 58, the tube 66 becomes current-conductive at the second or higher critical speed of the locomotive, to produce operation of the magnet switches 63 to close the resistance shunting circuits 62. The result is essentially the same as before described in respect to the system of tube 44.

It will appear now that as the locomotive speed rises, resistance-shunting of the traction motor series fields will occur in successive field weakening steps determined by the voltages of the axle driven generator 58 in opposition to the grid bias battery 51, and the relative tap connections of the vacuum tube relay grids to the voltage divider resistance 52. Thus, the vacuum tube relay 44 will become conductive at a first critical speed of the locomotive, to produce initial weakening of motor field excitation, while the vacuum tube relay 66 becomes conductive at a higher critical speed of the locomotive, to cause a further weakening of motor field excitation in the manner described. When the locomotive speed decreases from a point beyond the indicated higher critical speed, the vacuum tube relays are rendered non-conductive sequentially in the inverser order, to result in increase of motor field excitation by successive removal of the field shunt resistances.

It is apparent from the foregoing, that while but two steps of traction motor field excitation control are shown in the embodiment of the invention, according to Fig. 1, additional steps may be included in the system through additional field shunting resistances or shunting circuits in connection with the resistances 30 and 35, together with vacuum tube control relays therefore, having the tube grid elements tapped to the voltage divider 52 at appropriate points thereon. An example of a four step system is shown in Fig. 2, in application to the series field 75 of traction motors 76 supplied from the power mains 14 and 15. Field shunting resistance 77 is controlled by a normally open electromagnet switch 78 energized from the supply circuit 39—40 under control of the vacuum tube relay 80, the latter having its grid tapped at 81 to the voltage divider 82. A second field shunting resistance 84 in parallel to resistance 77, is controlled by normally open electromagnet switch 85 under control of vacuum tube relay 86 having its grid tapped to the divider 82, at 88. Circuit 89 for shunting a portion of resistance 77, includes electromagnet switch 90 under control of vacuum tube relay 92 the grid of which is tapped to the divider at 93. Similarly, circuit 94 for shunting a portion of resistance 84, includes electromagnet switch 96 under control of vacuum tube relay 97, the grid of the latter being tapped at 98 to the divider 82. In circuit with divider 82 is the grid bias battery 100 and the rectifier 101 supplied by axle driven generator 102. The sequence of operation of the four step system in response to increasing locomotive speed, is such that at a first critical speed the tube 80 becomes conductive to actuate switch 78, thus introducing shunting resistance 77 across the motor fields 75. At a next higher critical speed, the tube 86 functions to close switch 85, thereby placing resistance 84 in parallel to resistance 77. Upon further rise of locomotive speed to the next critical speed, the tube 92 functions to close switch 90, thereby shunting a portion of resistance 77. At a still higher critical speed, the tube 97 operates to close switch 96 and shunt a portion of the resistance 84. The sequence of resistance removal upon decreasing locomotive speed, is the inverse of that above described for increasing speeds.

Among the important features of the present system of traction motor field excitation control, are the employment of vacuum tubes for operating electromagnet relays in control of resistance-shunting of the motor fields; the utilization of a negative grid bias voltage on the vacuum tube grids of a value sufficiently high to insure quick pick-up and drop-out of the electromagnetic switches as the voltage of the axle driven generator respectively reaches and exceeds slightly or drops slightly below the negative bias voltage, and the control of relay operation by an axle driven generator responsive directly to locomotive speeds. As an indication of the high negative bias voltage, in a typical installation of the present system wherein the potential of the vacuum tube controlled electromagnet supply circuit 39—40 is 75 volts, the voltage of the grid bias battery (51 and 100) is approximately 45 volts.

Having described the present invention with respect to illustrative embodiments thereof, I desire to claim and secure by Letters Patent the following:

1. In a vehicle traction motor control system for adjusting traction motor field excitation at different predetermined vehicle speeds through field shunting resistance means, electromagnetic switches in control of the field shunting resistance means, a direct current energizing circuit for the electromagnetic switches, including electron discharge devices individual to the switches, each electron discharge device having a control grid, grid control means for impressing on the control grids a constant negative biasing voltage normally rendering the electron discharge devices nonconductive, said grid control means including a voltage dividing element and separate circuit connections between said element and the control grids of said electron discharge devices, and means in circuit with said voltage dividing element and providing a voltage varying in accordance with vehicle speed, effective through said element for rendering the electron discharge devices conductive each at a different predetermined vehicle speed.

2. In an electric motor-driven vehicle having a series field traction motor, regulating means for altering the excitation current flow through the series field of the motor at certain speeds of the vehicle, said means comprising a field shunting resistance, an electromagnetic switch for controlling shunting connection of the resistance to the motor field, a circuit including a second electromagnetic switch for shunting a portion of said resistance, a source of operating potential for said switches, an electron discharge device for each of said switches controlling energization thereof from said source, grid control means normally biasing said electron discharge devices to a non-conductive condition, and a control circuit connected to said grid control means and including a generator the voltage of which varies in proportion to vehicle speed, said control circuit being effective for rendering one of the electron discharge devices conductive at one speed of the vehicle and for rendering the other electron discharge device conductive at another speed of the vehicle.

3. In an electric motor-driven vehicle having a series field traction motor, a regulating system for reducing the motor field excitation at certain speeds of the vehicle, said system comprising a field shunting resistance, an electromagnetic switch for controlling connection of the resistance in shunt to the motor field, a circuit including a second electromagnetic switch, arranged in shunt to a portion of said resistance, a source of switch operating potential, electron discharge devices for controlling energization of said switches from said source, each electron discharge device having a control grid, a grid circuit including a control resistance to which the control grids of the electron discharge devices are connected, said circuit providing a negative biasing voltage on the control grids normally rendering the electron discharge devices nonconductive, and means for impressing on said grid circuit control resistance a voltage varying in proportion to the speed of the vehicle, the impressed voltage acting in opposition to the negative biasing voltage on the control grids of the electron discharge devices and causing one of the electron discharge devices to become conductive at one vehicle speed and the other electron discharge device to become conductive at another vehicle speed.

4. A vehicle traction motor control system for adjusting motor field excitation at different vehicle speeds through field shunting resistance means, the system comprising electromagnetic switches in control of the field shunting resistance means, an energizing circuit for the switches, including electron discharge devices individual to the switches and each having a control grid, grid control means impressing on the control grids a negative biasing voltage normally rendering the electron discharge devices nonconductive, said grid control means including a voltage dividing resistor having end terminals and circuit conductor means connecting said control grids to the resistor intermediate its end terminals, and circuit means connected to said resistor end terminals and impressing on said voltage divider resistor a voltage varying in proportion to vehicle speed, said circuit means being effective through said voltage divider resistor, to render said electron discharge devices conductive progressively at different voltages of said circuit means corresponding to different vehicle speeds.

5. A vehicle traction motor control system for adjusting motor field excitation at different vehicle speeds through field shunting resistance means, the system comprising electromagnetic switches in control of the field shunting resistance means, an energizing circuit for said switches including electron discharge devices individual to the switches and each having a control grid, a grid control circuit energized such as to impress on the control grids a constant negative biasing voltage normally rendering the electron discharge devices nonconductive, said grid control circuit including a voltage divider resistor and circuit connections from the control grids to separate points of said resistor, and circuit means including a vehicle-driven generator, impressing on said resistor a positive voltage varying in proportion to vehicle speed, said circuit means being effective through said resistor, to render said electron discharge devices conductive progressively at different voltages of said circuit means corresponding to different vehicle speeds.

6. A vehicle traction motor control system for adjusting motor field excitation at different vehicle speeds through field shunting resistance means, the system comprising electromagnetic switches in control of the field shunting resistance means, an energizing circuit for said switches including electron discharge devices individual to the switches for effecting energization and deenergization of the latter according to the conductive and nonconductive conditions of the devices, respectively, said electron discharge devices being of vacuum tube type and each having a control grid, a grid control circuit energized such as to impress on said control grids a constant negative biasing voltage normally rendering the electron discharge devices nonconductive, said grid control circuit including a voltage divider resistor and circuit connections from the control grids to separate points of said resistor, and circuit means including a vehicle-driven generator, impressing on said resistor a positive voltage varying in proportion to vehicle speed, said circuit means being effective through said resistor, to render said electron discharge devices conductive progressively at different voltages of said circuit means corresponding to different vehicle speeds in the speed increasing direction.

7. The subject matter of claim 6 characterized further in that said circuit means is effective upon decreasing vehicle speeds, to restore said electron discharge devices progressively in the inverse order at different reduced vehicle speeds, to the influence of said grid control circuit impressing a negative biasing voltage on the control grids rendering the electron discharge devices nonconductive.

EDGAR J. JUSTUS.

REFERENCES CITED

The following references are of record in the file of this patent:

UNITED STATES PATENTS

| Number | Name | Date |
|---|---|---|
| 1,819,465 | James | Aug. 18, 1931 |
| 2,442,013 | Mott et al. | May 25, 1948 |
| 2,510,296 | Root | June 6, 1950 |